US010615658B2

(12) United States Patent
Litinsky et al.

(10) Patent No.: US 10,615,658 B2
(45) Date of Patent: Apr. 7, 2020

(54) CORONA SHIELDING SYSTEM FOR A HIGH-VOLTAGE MACHINE, REPAIR LACQUER, AND METHOD FOR PRODUCTION

(71) Applicant: Siemens Aktiengesellschaft, München (DE)

(72) Inventors: Alexander Litinsky, Mülheim (DE); Andrey Mashkin, Köln (DE); Friedhelm Pohlmann, Essen (DE); Guido Schmidt, Leichlingen (DE); Christian Staubach, Marl (DE)

(73) Assignee: Siemens Aktiengesellschaft, München (DE)

( * ) Notice: Subject to any disclaimer, the term of this patent is extended or adjusted under 35 U.S.C. 154(b) by 503 days.

(21) Appl. No.: 15/305,792

(22) PCT Filed: Apr. 20, 2015

(86) PCT No.: PCT/EP2015/058511
§ 371 (c)(1),
(2) Date: Oct. 21, 2016

(87) PCT Pub. No.: WO2015/172976
PCT Pub. Date: Nov. 19, 2015

(65) Prior Publication Data
US 2017/0054341 A1 Feb. 23, 2017

(30) Foreign Application Priority Data
May 12, 2014 (DE) .................. 10 2014 208 857

(51) Int. Cl.
*H01B 1/12* (2006.01)
*H02K 3/40* (2006.01)
(Continued)

(52) U.S. Cl.
CPC .................. *H02K 3/40* (2013.01); *B05D 5/12* (2013.01); *C09D 5/24* (2013.01); *C09D 5/26* (2013.01);
(Continued)

(58) Field of Classification Search
CPC ... H01B 1/00; H01B 1/20; H01B 1/22; H01B 1/24; C09D 5/24; C09J 9/02; H05K 3/321; B05D 5/12
See application file for complete search history.

(56) References Cited

U.S. PATENT DOCUMENTS 4,129,537 A * 12/1978 Dhein .................. C09D 125/14
525/286
4,699,810 A * 10/1987 Blakeman .................. C08J 9/32
220/378
(Continued)

FOREIGN PATENT DOCUMENTS

CN 101179212 A 5/2008
CN 101203921 A 6/2008
(Continued)

OTHER PUBLICATIONS

Chinese language Office Action for CN Application No. 201580025234.4, dated May 4, 2018.
(Continued)

*Primary Examiner* — Mark Kopec
(74) *Attorney, Agent, or Firm* — Schmeiser, Olsen & Watts LLP

(57) ABSTRACT

A corona shielding system for a high voltage machine including a sleeve for a live conductor of the high voltage machine, wherein the sleeve has an electrically conductive lacquer, wherein a filler is added to the conductive lacquer,
(Continued)

the filler at least partially including a thermoexpanding filler, is provided. A repair lacquer and a method for production is further provided.

26 Claims, 2 Drawing Sheets

(51) Int. Cl.
  B05D 5/12 (2006.01)
  C09D 5/24 (2006.01)
  H02K 15/10 (2006.01)
  C09D 5/26 (2006.01)
  H02K 15/00 (2006.01)
(52) U.S. Cl.
  CPC ........... *H01B 1/12* (2013.01); *H02K 15/0006* (2013.01); *H02K 15/105* (2013.01)

(56) References Cited

U.S. PATENT DOCUMENTS

| | | | | |
|---|---|---|---|---|
| 4,837,271 | A * | 6/1989 | Brindopke | C08K 5/0025 525/330.3 |
| 5,167,868 | A * | 12/1992 | Willey | C04B 35/536 252/500 |
| 5,264,065 | A * | 11/1993 | Kohm | H05K 1/0373 156/307.4 |
| 5,319,276 | A | 6/1994 | Schuler | |
| 5,792,398 | A * | 8/1998 | Andersson | B32B 5/02 264/257 |
| 6,207,730 | B1 * | 3/2001 | Hogan, III | C08G 59/18 523/219 |
| 7,285,306 | B1 | 10/2007 | Parrish | |
| 2002/0039658 | A1 * | 4/2002 | Bunyan | F16J 15/064 428/450 |
| 2008/0106157 | A1 | 5/2008 | Higashimura et al. | |
| 2008/0152898 | A1 | 6/2008 | Donzel et al. | |
| 2008/0230253 | A1 | 9/2008 | Williams et al. | |
| 2008/0314619 | A1 * | 12/2008 | Kim | H05K 1/095 174/250 |
| 2013/0300248 | A1 | 11/2013 | Ishida | |
| 2014/0083592 | A1 | 3/2014 | Groeppel | |
| 2015/0041178 | A1 | 2/2015 | Brockschmidt et al. | |

FOREIGN PATENT DOCUMENTS

| | | |
|---|---|---|
| CN | 101291086 A | 10/2008 |
| CN | 101682239 A | 3/2010 |
| CN | 103765731 A | 4/2014 |
| CN | 104303239 A | 1/2015 |
| DE | 202004015355 U1 | 12/2004 |
| DE | 102005002169 B4 | 1/2011 |
| DE | 102010054779 A1 | 7/2011 |
| DE | 102011079813 A1 | 1/2013 |
| DE | 102012205048 A1 | 10/2013 |
| EP | 2521247 A1 | 11/2012 |
| EP | 2624258 A1 | 8/2013 |
| RU | 2099843 C1 | 12/1997 |
| WO | 9743818 A1 | 11/1997 |

OTHER PUBLICATIONS

International Search Report for PCT Application No. PCT/EP2015/058511, dated Sep. 1, 2015.

* cited by examiner

CORONA SHIELDING SYSTEM FOR A HIGH-VOLTAGE MACHINE, REPAIR LACQUER, AND METHOD FOR PRODUCTION

CROSS-REFERENCE TO RELATED APPLICATIONS

This application claims priority to PCT Application No. PCT/EP2015/058511, having a filing date of Apr. 20, 2015, based off of German application No. DE 102014208857.7, having a filing date of May 12, 2014, the entire contents of which are hereby incorporated by reference.

FIELD OF TECHNOLOGY

The following relates to the field of corona shielding systems for a high-voltage machine having a covering for a current-carrying conductor of the high-voltage machine, wherein the covering has an electrically conductive lacquer, wherein a filler is added to the conductive lacquer. The following also relates to a repair lacquer and to a method for producing same. Such corona shielding systems, repair lacquers and methods are of interest in particular for rotating electrical machines, for example generators and/or motors.

BACKGROUND

In single-bar or whole-body impregnation, the generator winding bars of turbogenerators are shielded from cavities and detachments by an inner conducting layer ("inner potential grading" IPG) and an outer conducting layer ("external corona shielding" ECS). A turbogenerator is at present usually realized in the form of a three-phase AC synchronous machine comprising a solid two-pole or four-pole rotor. The power range of such a turbogenerator is typically between approximately 20 MVA and approximately 2000 MVA.

The stator of a conventional synchronous generator comprises a multiplicity of so-called stator windings, in which an AC voltage is induced by inductive interaction with the rotating rotor, to which a constant current is applied. The stator windings are accommodated in a so-called laminated core. This is used, inter alia, for guiding and intensifying the magnetic field. In order to reduce losses as a result of eddy currents, the entire laminated core is constructed from thin laminations which are insulated from one another. The stator windings consist of a multiplicity of bars, whose respective central pieces (the so-called "active parts") are inserted into slots in the laminated core. The individual bars emerge from the slots in involute fashion at the so-called "end winding". There, the individual bars are interconnected to form the stator winding (i.e. contact is made between said individual bars).

The bars or bar regions lying in the laminated core are at a high electrical potential and are therefore insulated from one another and from the earthed laminated core by a main insulating layer.

In order to avoid partial discharges at operating voltages of a few kV, the main insulating layer is generally shielded from cavities and detachments by an inner and an outer conducting layer ("inner potential grading" IPG and "external corona shielding" ECS). The electrical field strength in the main insulating layer is reduced starting from the IPG in a radial direction up to the ECS. This ensures that the electrical field remains only inside the main insulation and no partial discharges between the main insulation and an earthed laminated core take place. In addition, for axial grading of the electrical field at the end of the external corona shielding, a weakly conductive overhang corona shielding is applied and is electrically connected to the external corona shielding.

The external corona shielding of rotating electrical machines is subject to natural aging due to thermomechanical stresses, vibration or partial discharge activity, depending on the manufacturer and construction of the generator. As a result, part of the external corona shielding is eroded. A particular form in this context is erosion of electrical origin. The erosion locations affect in principle the entire length of the external corona shielding, wherein, depending on the manufacturer and construction of the generator, either the external corona shielding inside the laminated core or the external corona shielding outside the laminated core is affected to a greater degree. The erosion progressing in the axial direction disrupts the electrical connection between the overhang corona shielding and the laminated core. In the radial direction, there are on one hand partial discharges, and on the other hand the bars are loosened and thus, in extreme cases, subject to severe vibration.

There is therefore a need for a conductive substance which can bridge the existing (when used as a repair lacquer) or developing (when used during generator manufacture) gaps, and ensures conductive wetting of the exposed surface of the main insulation. However, this has the disadvantage that most polymer-based lacquers and paints shrink on drying or curing, and therefore in particular gap-free bridging of gaps is rendered more difficult. Thermomechanical load cycles also mean that re-occurrence of the gaps during operation cannot be excluded.

SUMMARY

An aspect relates to providing a corona shielding system that is improved with respect to erosion. A second object is to specify a repair lacquer for carrying out repairs on an eroded corona shielding system. A third object is to specify a method for carrying out repairs on an eroded corona shielding system.

The first object is achieved by specifying a corona shielding system for a high-voltage machine comprising a covering for a current-carrying conductor of the high-voltage machine, wherein the covering has an electrically conductive lacquer, wherein a filler is added to the conductive lacquer, and wherein the filler at least partially comprises a thermally expanding filler.

The second object is achieved by specifying a repair lacquer for repairing a covering for a high-voltage machine, comprising an electrically conductive lacquer, wherein a filler is added to the conductive lacquer, and wherein the filler at least partially comprises a thermally expanding filler.

The repair lacquer can preferably be used for repairing an eroded covering as described above.

Adding thermally expandable filler to the conductive lacquer (hereinbelow also termed 'matrix' in parallel) can produce a thermally expandable lacquer or repair lacquer. A repair lacquer of this type would, in a liquid state, fill the erosion locations—i.e. the gaps—as well as locations with an eroded ECS as much as possible, would then (pre)gel or pre-dry (e.g. in the case of a matrix that crosslinks at room temperature) under ambient conditions, and would then expand under the influence of heat. The pre-gelling inside the repair lacquer prevents excessive expansion, and as a result the filler can expand only as much as permitted by the intermolecular bonds in the lacquer.

It is thus possible for the gaps on eroded corona shielding regions to be better and more reliably filled, in comparison with the unfilled, shrinking conductive lacquer of the prior art. In addition to expansion of the filler, the temperature effect also causes final crosslinking of the lacquer such that the lacquer or the repair lacquer solidifies sufficiently. Depending on the matrix material, it is however possible to achieve a targeted residual elasticity which is necessary to compensate for any thermomechanical load cycles.

Preferably, the filler is electrically conductive. In that context, the electrical conductivity can be inherent or can be established by a coating or surface treatment.

Preferably, the filler consists entirely of thermally expanding filler.

In a particular embodiment, the thermally expanding filler at least partially comprises microscopic hollow spheres of which the envelope consists of polymers. Preferably, various inorganic coatings, which have a positive effect on mechanical strength, erosion resistance, thermal or electrical conductivity, are applied to or deposited on the envelope. In a particular embodiment, the hollow spheres contain gas and/or boiling liquid, wherein, under the action of heat, the envelope of the hollow spheres softens and the gas or the boiling liquid contained in the hollow spheres causes an expansion. Thus, heat causes the resulting thermally expandable lacquer to take up more volume and, respectively, to be able to fill the available volume.

Of advantage for use as conductive lacquer is the fact that the surface of such hollow spheres is wetted with the lacquer, due to the viscosity of the lacquer, and therefore the cavities inside the hollow spheres are electrically shielded. It is thus also possible to use hollow spheres having no conductive coating.

For polymeric sphere shell materials, the temperature range for expansion of the hollow spheres is in the range of 60-220° C. The degree of possible expansion of the spheres at a given temperature, and the reversibility or one-off nature of the expansion can be set by means of a suitable choice for the sphere shell material and the filler.

Typical dimensions:
Sphere diameter, unexpanded: 10-40 μm,
Sphere diameter, expanded: up to 200 μm,
Wall thickness: from several tens of μm (unexpanded) to several μm or less (expanded).

In that context, the material properties of the thermally expandable material, essentially the degree of filling with hollow spheres and the size of these, and the properties of the lacquer containing and enclosing the micro hollow spheres, are crucial. It is also possible for the expansion of the spheres to be limited by the lacquer or the temperature. Thus, the expansion of the overall material is limited.

In order to increase the erosion resistance of the repair lacquer, it is also possible for nanoscale or microscale inorganic erosion-inhibiting particles to be added to the lacquer or to the matrix. This significantly reduces the rate of erosion in the event of partial discharges.

In a preferred embodiment, the lacquer is elastic or semi-elastic. Thus, a lacquer for use in the context of generator manufacture or repair is also conceivable, which lacquer can expand, in the event of erosion, by operating heat or by a special heating procedure/generator heat cycle. If part of the lacquer is eroded, the eroded volume can be at least partially filled by expansion of the remaining regions. This reduces the rate of erosion.

Preferably, the expansion temperature of the thermally expanding filler is above the gelation temperature and/or the curing temperature of the lacquer. If the expansion temperature of the filler is above the gelation temperature and/or the curing temperature of the lacquer or of the matrix, it is also possible to use a heat-curing lacquer system. This enables short repair times.

Preferably, the lacquer with the thermally expanding filler is already pre-gelled. The pre-gelling inside the lacquer prevents excessive expansion, and as a result the filler particles can expand only as much as permitted by the intermolecular bonds in the lacquer. It is thus possible for the gaps on eroded regions to be better and more reliably filled, in comparison with the unfilled, shrinking conductive lacquer of the prior art.

In a preferred embodiment, the lacquer with the thermally expanding filler has different degrees of crosslinking on application. Different degrees of crosslinking in the lacquer layer allow expansion in the axial direction into the otherwise very hard-to-reach gaps. In that context, the lacquer material can in particular consist on one hand essentially of monomers which concatenate and/or crosslink during the curing reaction to give the solid. Alternatively, the matrix material can also already consist of partially pre-crosslinked (B-stage) polymers which then crosslink further during the curing reaction to give the solid. In that context, such a curing reaction can take place in particular by polymerization, polyaddition or polycondensation. Different degrees of crosslinking in the lacquer now causes expansion in the axial direction into the otherwise very hard-to-reach gaps.

Preferably, the corona shielding system is an external corona shielding. Alternatively, the corona shielding system is preferably an overhang corona shielding.

The third object is achieved by specifying a method for producing a corona shielding system comprising a conductive covering for a current-carrying conductor of a high-voltage machine, wherein the covering is at least partially eroded, the method having the following steps:

providing a conductive lacquer, wherein a thermally expanding filler is added to the conductive lacquer, applying the conductive lacquer, with the added thermally expanding filler, at least to the erosion location, flowing in of the conductive lacquer, with the added thermally expanding filler, at least partially into the erosion location, pre-drying and/or pre-gelling of the conductive lacquer with the added thermally expanding filler, expansion of the conductive lacquer, with the added thermally expanding filler, wherein as a consequence of the expansion the erosion location is essentially completely filled.

Preferably, the expansion can be effected by heating with hot air and/or in operation by operating heat, e.g. of the generator. If, moreover, the expansion temperature of the filler is above the gelation temperature and/or the curing temperature of the lacquer, it is also possible to use a heat-curing lacquer. This enables short repair times.

Preferably, the thermally expanding filler at least partially comprises microscopic hollow spheres of which the envelope consists of polymers, wherein the expansion of the hollow spheres is limited by the lacquer or the temperature. Under the action of heat, the envelope of the hollow spheres softens and the gas and/or the boiling liquid contained in the hollow spheres lead to an expansion. Thus, heat causes the resulting thermally expandable repair lacquer to take up more volume and, respectively, to be able to fill the available volume.

Preferably, the degree of possible expansion of the spheres at a given temperature, and the reversibility or one-off nature of the expansion are set by determining the sphere shell material and the filler. Crucial to the material properties of the thermally expandable material are essentially the degree of filling with hollow spheres and the size of these, and the properties of the lacquer containing and enclosing the micro hollow spheres. It is also possible for the expansion of the spheres to be limited by the lacquer or the temperature. Thus, the expansion of the overall material is limited.

Embodiments of the invention permit a more rapid, more reliable and more durable repair of the corona shielding using the repair lacquer. It also provides an improved corona shielding system. If part of the lacquer according to embodiments of the invention is eroded, the eroded volume can namely be at least partially filled by expansion of the remaining regions. This reduces the rate of erosion. It is in principle possible to avoid having to create a new winding.

BRIEF DESCRIPTION

Some of the embodiments will be described in detail, with reference to the following figures, wherein like designations denote like members, wherein.

DETAILED DESCRIPTION

Figure 1:
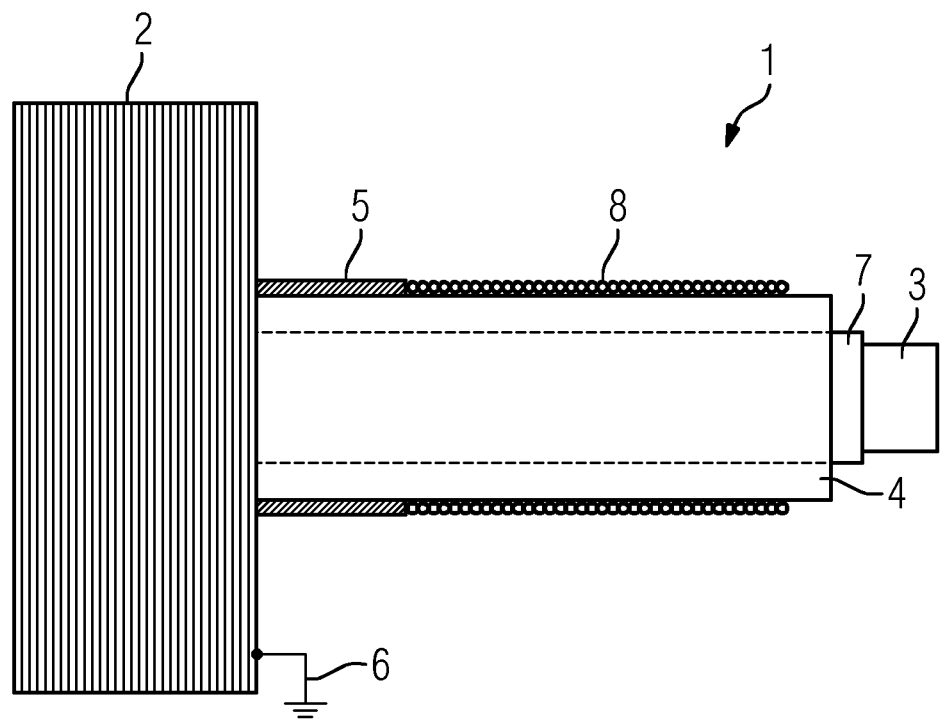
FIG. 1 shows a longitudinal section through the stator of a turbogenerator, having an embodiments of the corona shielding system.

As shown in the figure, a turbogenerator stator 1 has a stator laminated core 2, out of which a generator winding bar 3 projects. The generator winding bar 3 is surrounded by a main insulation 4, wherein the winding bar 3 is arranged with its main insulation 4 and with one of its ends also outside the stator laminated core 2. The figure shows, in the region of the point at which the winding bar 3 emerges from the stator laminated core 2, an external corona shielding 5 which surrounds the main insulation 4 and is grounded via the laminated core by a grounding means 6. An inner potential grading 7 is also provided between the generator winding bar 3 and the main insulation 4. The overhang corona shielding 8 encloses the main insulation 4 over a partial length starting from that end of the external corona shielding 5 which is oriented away from the stator laminated core 2. The corona shielding system can comprise the external corona shielding 5 and the overhang corona shielding 8, wherein the overhang corona shielding is electrically connected to the external corona shielding at its end oriented toward the laminated core. The elements 3, 4, 5, 7 pass through the slot (not depicted) of the laminated core and also have, at the other end of the laminated core, the arrangement corresponding to FIG. 1 with an overhang corona shielding 8.

The possible erosion locations affect in principle the entire length of the external corona shielding, wherein, depending on the manufacturer and construction of the generator, either the external corona shielding inside the laminated core or the external corona shielding outside the laminated core is affected to a greater degree. The erosion progressing in the axial direction disrupts the electrical connection between the overhang corona shielding and the laminated core. In the radial direction, there are on one hand partial discharges, and on the other hand the bars are loosened and thus, in extreme cases, subject to severe vibration. Of course, the erosion can also or additionally affect the overhang corona shielding 8.

Repair and/or manufacture therefore requires a conductive substance which can bridge the existing or developing gaps, and will ensure conductive wetting of the exposed surface of the main insulation.

Figure 2:
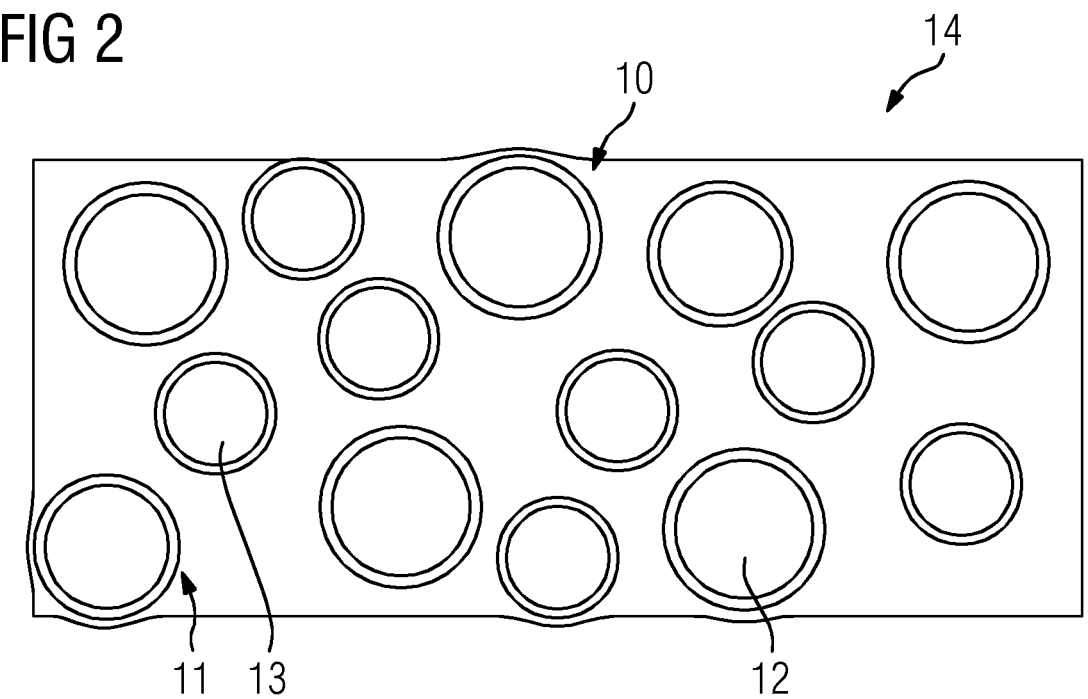
FIG. 2 shows an embodiment of a repair lacquer.

Adding thermally expandable filler to the conductive lacquer 10 (hereinbelow also termed 'matrix' in parallel) (FIG. 2) can produce a thermally expandable repair lacquer 14 (FIG. 2).

FIG. 2 shows such a repair lacquer 14. A repair lacquer 14 of this type (FIG. 2) will, in a liquid state, fill the gaps as much as possible, will then gel or pre-dry (e.g. in the case of a matrix that crosslinks at room temperature) under ambient conditions, and will then expand under the influence of heat.

The pre-gelling/pre-drying inside the repair lacquer 14 prevents excessive expansion, and as a result the filler can expand only as much as permitted by the intermolecular bonds in the lacquer 10.

It is thus possible in particular for the gaps on eroded corona shielding regions to be better and more reliably filled, in comparison with the unfilled, shrinking lacquer of the prior art. The thermally expandable filler used can be microscopic hollow spheres 13 of which the envelope 11 consists of polymers. Various organic or inorganic coatings, which have a positive effect on mechanical strength, erosion resistance, and thermal or electrical conductivity, can be applied to or deposited on the envelope 11. Under the action of heat, the envelope 11 of the hollow spheres 13 softens and the gas 12 and/or the boiling liquid 12 contained in the hollow spheres 13 leads to an expansion. Thus, heat causes the resulting thermally expandable repair lacquer 14 to take up more volume and, respectively, to be able to fill the available volume.

Of advantage for use as conductive lacquer is the fact that the surface of such hollow spheres 13 is wetted with the lacquer 10, due to the viscosity of the lacquer, and therefore the cavities inside the hollow spheres are electrically shielded. It is thus also possible to use hollow spheres 13 having no conductive coating.

For polymeric sphere shell materials, the temperature range for expansion of the hollow spheres 13 is in the range of 60-220° C. The degree of possible expansion of the hollow spheres 13 at a given temperature, and the reversibility or one-off nature of the expansion can be set by means of a suitable choice for the sphere shell material and the filler. In that context, possible sphere diameters are: 10-40 μm unexpanded, up to 200 μm expanded. The wall thickness can in this case range from several tens of μm (unexpanded) to several μm or less (expanded).

Crucial to the material properties of the thermally expandable material are essentially the degree of filling with hollow spheres 13 and the size of these, and the properties of the lacquer 10 containing and enclosing the micro hollow spheres 13. It is also possible for the expansion of the hollow spheres 13 to be limited by the lacquer 10 or the temperature. Thus, the expansion of the overall material is limited.

During repair, the expansion can be effected by heating with hot air or in operation by operating heat, e.g. of the generator, or by a higher temperature action still, in the context of a special generator heat cycle. In addition, if the expansion temperature of the filler is above the gelation temperature and/or the curing temperature of the lacquer 10, it is also possible to use a heat-curing lacquer system 10. This enables short repair times.

Another possibility offers the choice of an elastic or semi-elastic lacquer 10 or matrix. Thus, a repair lacquer or a lacquer for use in the context of generator manufacture 14 is also conceivable, which lacquer can expand, in the event of erosion, by operating heat or by a special heating procedure/generator heat cycle. If part of the lacquer 14 is eroded, the eroded volume can be at least partially filled by expansion of the remaining regions. This reduces the rate of erosion.

In order to increase the erosion resistance of the repair lacquer 14, it is also possible for nanoscale or microscale inorganic erosion-inhibiting particles (not shown) to be added to the lacquer 10. This significantly reduces the rate of erosion in the event of partial discharges.

Figure 3:
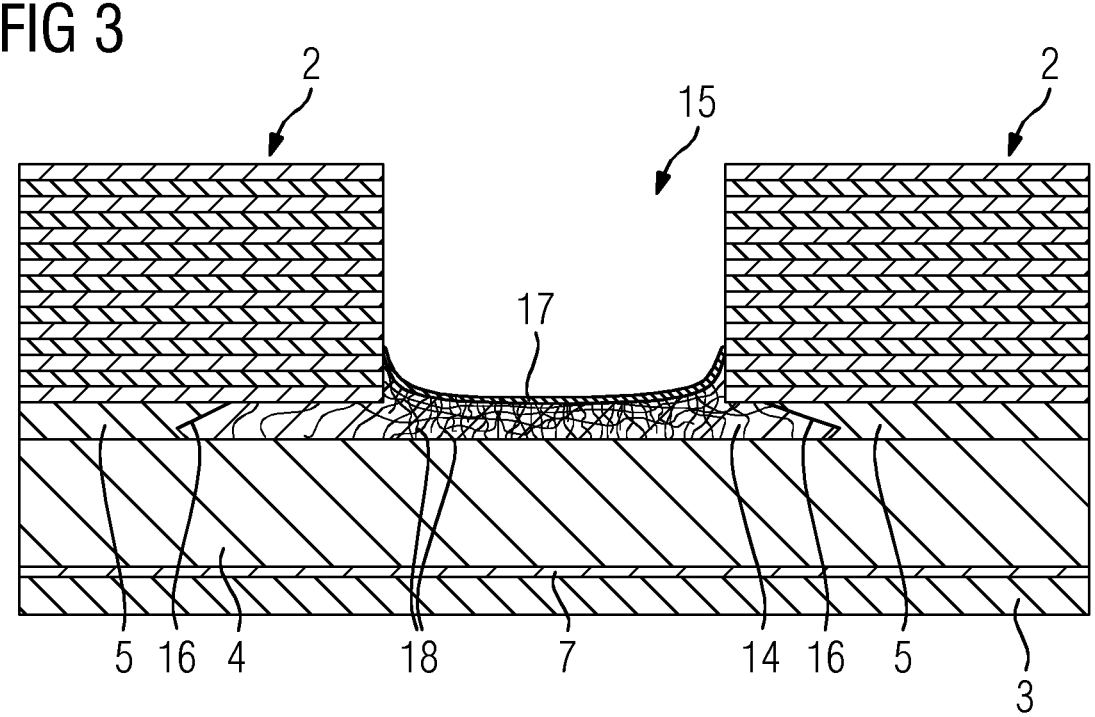
FIG. 3 shows an embodiment of the method with reference to the repair of a hard-to-reach location.

In addition, different degrees of crosslinking in the repair lacquer 14 allow expansion in the axial direction into the otherwise very hard-to-reach gaps. This is described with reference to FIG. 3:

FIG. 3 shows the repair of a hard-to-reach erosion location 16 in the cooling channel 15 of the laminated core. The crosslinked lacquer skin 17 and the differently crosslinked internal regions 18 within the repair lacquer 14 produce a barrier at the surface which can block the expansion of the lacquer in the radial direction (upward in FIG. 3) and can promote expansion in the axial direction (left and right in FIG. 3). The differences in partial crosslinking of the repair lacquer 14 are a result of the differing degree of exposure, for example as a consequence of the layer thickness, to curing catalysts such as air, heat, UV light, etc.

In addition to expansion of the filler particles, the temperature effect also causes final crosslinking of the repair lacquer 14 such that the repair lacquer 14 solidifies sufficiently. Depending on the lacquer material, it is however possible to achieve a targeted residual elasticity which is necessary to compensate for any thermomechanical load cycles.

Embodiments of the invention permit a more rapid, more reliable and more durable repair of the corona shielding using the repair lacquer. It also provides an improved corona shielding system. If part of the lacquer according to embodiments of the invention is eroded, the eroded volume can namely be at least partially filled by expansion of the remaining regions. This reduces the rate of erosion. It is in principle possible to avoid having to create a new winding.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A repair lacquer for repairing a covering for a high-voltage machine, comprising:
an electrically conductive lacquer, wherein a filler is added to the conductive lacquer, wherein the filler at least partially comprises a thermally expanding filler;
wherein, during a repair of the high-voltage machine, the electrically conductive lacquer fills erosion locations of the high-voltage machine and locations of the high-voltage machine with an eroded external corona shielding, in a liquid state;
wherein the electrically conductive lacquer gels under ambient conditions and cross-links at room temperature to limit expansion of the electrically conductive lacquer to intermolecular bonds in the electrically conductive lacquer under ambient conditions and at room temperature;
wherein the electrically conductive lacquer expands under the influence of heat and causes final cross-linking of the electrically conductive lacquer.

2. The repair lacquer for repairing a covering for a high-voltage machine as claimed in claim 1, wherein the thermally expanding filler at least partially comprises a plurality of microscopic hollow spheres of which an envelope consists of polymers.

3. The repair lacquer for repairing a covering as claimed in claim 2, wherein various inorganic coatings are applied to or deposited on the envelope.

4. The repair lacquer for repairing a covering as claimed claim 1, wherein nanoscale and/or microscale inorganic erosion-inhibiting particles are added to the lacquer.

5. The repair lacquer for repairing a covering as claimed in claim 1, wherein the lacquer is elastic or semi-elastic.

6. The repair lacquer for repairing a covering as claimed claim 1, wherein an expansion temperature of the thermally expanding filler is above a gelation temperature and/or a curing temperature of the lacquer.

7. The repair lacquer for repairing a covering as claimed in claim 1, wherein the lacquer with the thermally expanding filler is pre-gelled.

8. The repair lacquer for repairing a covering as claimed in claim 1, wherein the lacquer with the thermally expanding filler has different degrees of crosslinking on application.

9. The repair lacquer as claimed in claim 1 for repairing a covering.

10. A corona shielding system for a high-voltage machine comprising:
a covering for a current-carrying conductor of the high-voltage machine, wherein the covering has an electrically conductive lacquer;
wherein a filler is added to the conductive lacquer, wherein the filler at least partially comprises a thermally expanding filler;
wherein, during a repair of the high-voltage machine, the electrically conductive lacquer fills erosion locations of the high-voltage machine and locations of the high-voltage machine with an eroded external corona shielding, in a liquid state;
wherein the electrically conductive lacquer gels under ambient conditions and cross-links at room temperature to limit expansion of the electrically conductive lacquer to intermolecular bonds in the electrically conductive lacquer under ambient conditions and at room temperature;
wherein the electrically conductive lacquer expands under the influence of heat and causes final cross-linking of the electrically conductive lacquer.

11. The corona shielding system for a high-voltage machine as claimed in claim 10, wherein the filler is electrically conductive.

12. The corona shielding system as claimed in claim 10, wherein the filler consists entirely of thermally expanding filler.

13. The corona shielding system as claimed in claim 10, wherein the thermally expanding filler at least partially comprises a plurality of microscopic hollow spheres of which an envelope consists of polymers.

14. The corona shielding system as claimed in claim 13, wherein various inorganic coatings, which have a positive effect on mechanical strength, erosion resistance, thermal or electrical conductivity, are applied to or deposited on the envelope.

15. The corona shielding system as claimed in claim 13, wherein the plurality of hollow spheres contain gas and/or boiling liquid, wherein, under the action of heat, the envelope of the plurality of hollow spheres softens and the gas and/or boiling liquid contained in the plurality of hollow spheres causes an expansion.

16. The corona shielding system as claimed in claim 10, wherein nanoscale and/or microscale inorganic erosion-inhibiting particles are added to the lacquer.

17. The corona shielding system as claimed in claim 10, wherein the lacquer is elastic or semi-elastic.

18. The corona shielding system as claimed in claim 10, wherein an expansion temperature of the thermally expanding filler is above a gelation temperature and/or a curing temperature of the lacquer.

19. The corona shielding system as claimed in claim 10, wherein the lacquer with the thermally expanding filler is pre-gelled.

20. The corona shielding system as claimed in claim 10, wherein the lacquer with the thermally expanding filler has different degrees of crosslinking on application.

21. The corona shielding system as claimed in claim 10, wherein the corona shielding system is an external corona shielding.

22. The corona shielding system as claimed in claim 10, wherein the corona shielding system contains an overhang corona shielding.

23. A method for producing a corona shielding system for a high-voltage machine, including a conductive covering for a current-carrying conductor of the high-voltage machine, wherein the covering is at least partially eroded, comprising the following steps:
    providing a conductive lacquer, wherein a thermally expanding filler is added to the conductive lacquer;
    applying the conductive lacquer, with the added thermally expanding filler, at least to an erosion location;
    flowing in of the conductive lacquer, with the added thermally expanding filler, at least partially into the erosion location;
    pre-drying and/or pre-gelling of the conductive lacquer with the added thermally expanding filler; and
    expanding the conductive lacquer, with the added thermally expanding filler, wherein, as a consequence of the expanding, the erosion location and the hard-to-reach regions thereof are essentially completely filled.

24. The method for producing a corona shielding system as claimed in claim 23, wherein the expansion is effected by heating with hot air and/or in operation by operating heat, in particular by operating heat of a generator, or by a special heating procedure/generator heat cycle.

25. The method for producing a corona shielding system as claimed in claim 23, wherein the thermally expanding filler at least partially comprises a plurality of microscopic hollow spheres of which the envelope consists of polymers, wherein the expansion of the plurality of hollow spheres is limited by the lacquer or temperature.

26. The method for producing a corona shielding system as claimed in claim 23, wherein the degree of expansion of the plurality of hollow spheres at a given temperature, and the reversibility or one-off nature of the expansion are set by determining the sphere shell material and the filler.

* * * * *